(12) United States Patent
Lin

(10) Patent No.: US 8,254,870 B2
(45) Date of Patent: Aug. 28, 2012

(54) BLUETOOTH PERIPHERAL AND PORTABLE ELECTRONIC DEVICE USING SAME

(75) Inventor: Yi-Pang Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 267 days.

(21) Appl. No.: 12/618,081

(22) Filed: Nov. 13, 2009

(65) Prior Publication Data

US 2010/0297940 A1 Nov. 25, 2010

(30) Foreign Application Priority Data

May 20, 2009 (CN) .......................... 2009 1 0302483

(51) Int. Cl.
*H04B 1/08* (2006.01)
*H04B 1/38* (2006.01)

(52) U.S. Cl. ..................................... 455/347; 455/90.3

(58) Field of Classification Search .................. 455/348, 455/575.3, 556.1, 550.1, 41.2, 90.3, 347, 455/569.1, 569.2, 575.4
See application file for complete search history.

(56) References Cited

U.S. PATENT DOCUMENTS

| 7,130,654 | B2 * | 10/2006 | Cho | 455/550.1 |
| 2002/0189000 | A1 * | 12/2002 | Jordan | 2/102 |
| 2007/0202934 | A1 * | 8/2007 | Kim | 455/575.3 |
| 2008/0032664 | A1 * | 2/2008 | Chou et al. | 455/348 |
| 2008/0125164 | A1 * | 5/2008 | Singh | 455/550.1 |
| 2008/0153543 | A1 * | 6/2008 | Newman et al. | 455/556.1 |

* cited by examiner

*Primary Examiner* — Nay A Maung
*Assistant Examiner* — Cindy Trandai
(74) *Attorney, Agent, or Firm* — Altis Law Group, Inc.

(57) ABSTRACT

A Bluetooth peripheral includes a sleeve, a Bluetooth earphone received in the sleeve, and a stylus latched to the sleeve. The invention also discloses a portable electronic device using the Bluetooth peripheral.

6 Claims, 6 Drawing Sheets

BLUETOOTH PERIPHERAL AND PORTABLE ELECTRONIC DEVICE USING SAME

BACKGROUND

1. Technical Field

The present disclosure relates to Bluetooth peripherals, and, particularly, to a Bluetooth peripheral used in a portable electronic device.

2. Description of Related Art

Bluetooth earphone and styluses are common peripherals of mobile phones. However, using peripherals with mobile phones can be clumsy and occupy too much space.

Therefore, there is a room for improvement within the art.

BRIEF DESCRIPTION OF THE DRAWINGS

Many aspects of a Bluetooth peripheral and portable electronic device using the Bluetooth peripheral can be better understood with reference to the following drawings. The components in the drawings are not necessarily to scale, the emphasis instead being placed upon clearly illustrating the principles of the present Bluetooth peripheral and portable electronic device using the Bluetooth peripheral. Moreover, in the drawings, like reference numerals designate corresponding parts throughout the several views.

DETAILED DESCRIPTION OF THE EMBODIMENT

Figure 1:
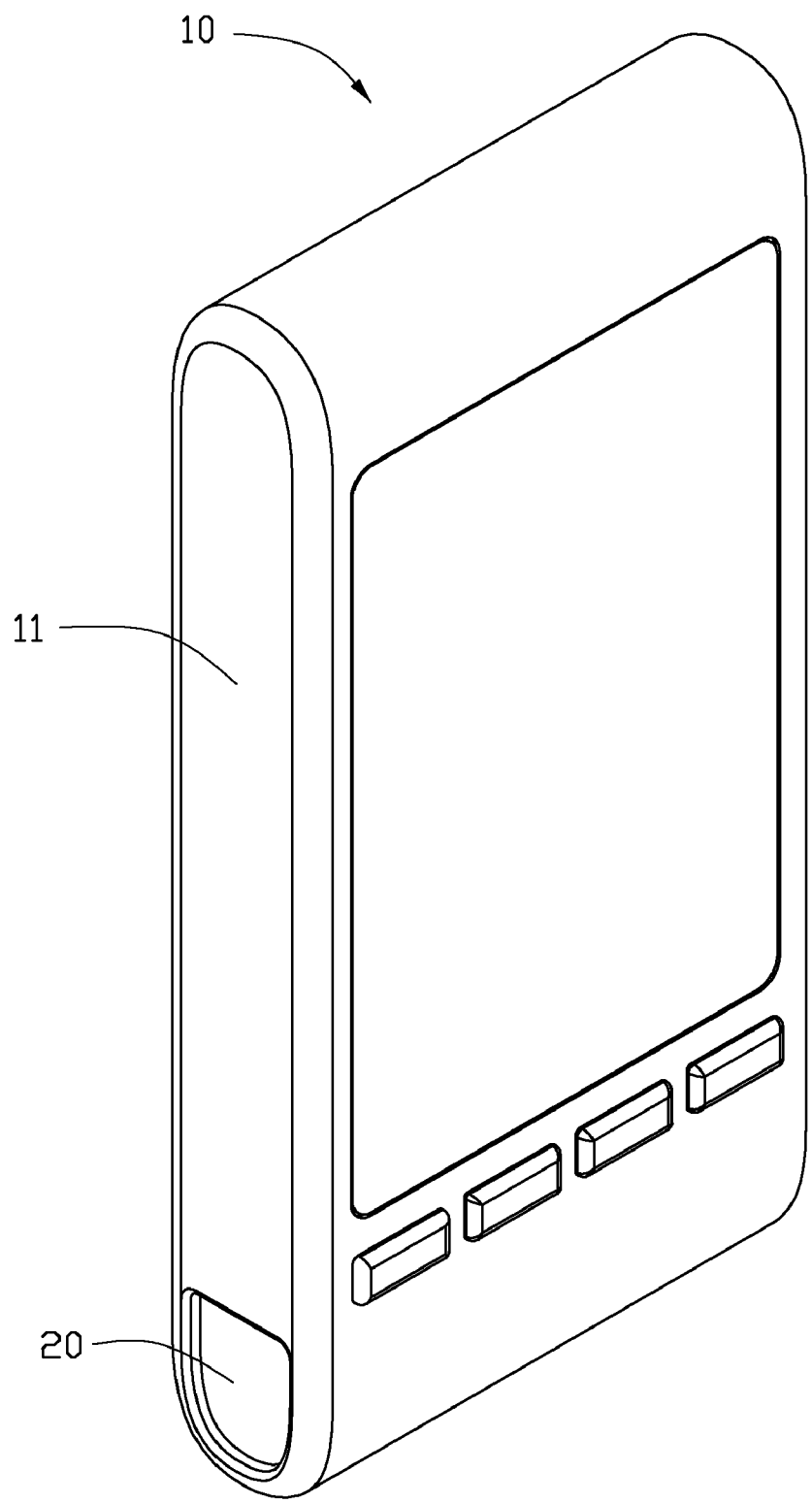
FIG. 1 is an isometric view of a portable electronic device according to an exemplary embodiment.

FIG. 1 shows an exemplary portable electronic device including a main body 10 and a Bluetooth peripheral 20 removably attached within the main body 10.

The main body 10 can be a housing of the portable electronic device. The main body 10 includes two sidewalls 11, an end wall 12, and defines a receiving chamber 13. The receiving chamber 13 is defined in the main body 10 and runs through the two sidewalls 11. The receiving chamber 13 has a first magnet 131 positioned in it. The first magnet 131 is positioned on an inner wall of the receiving chamber 13, adjacent to one of the sidewalls 11.

Figure 2:
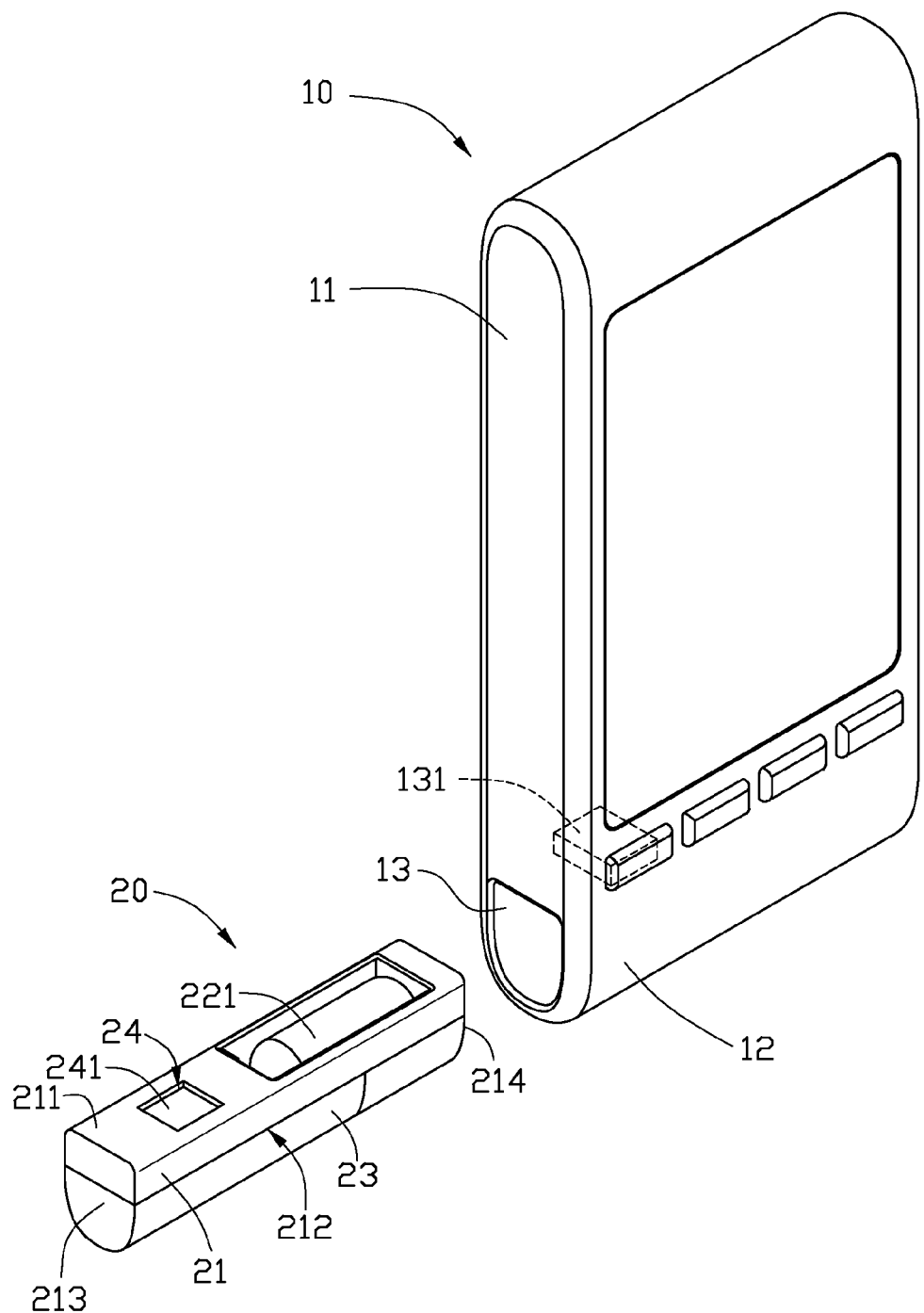
FIG. 2 is an exploded view of the portable electronic device using a Bluetooth peripheral.
Figure 3:
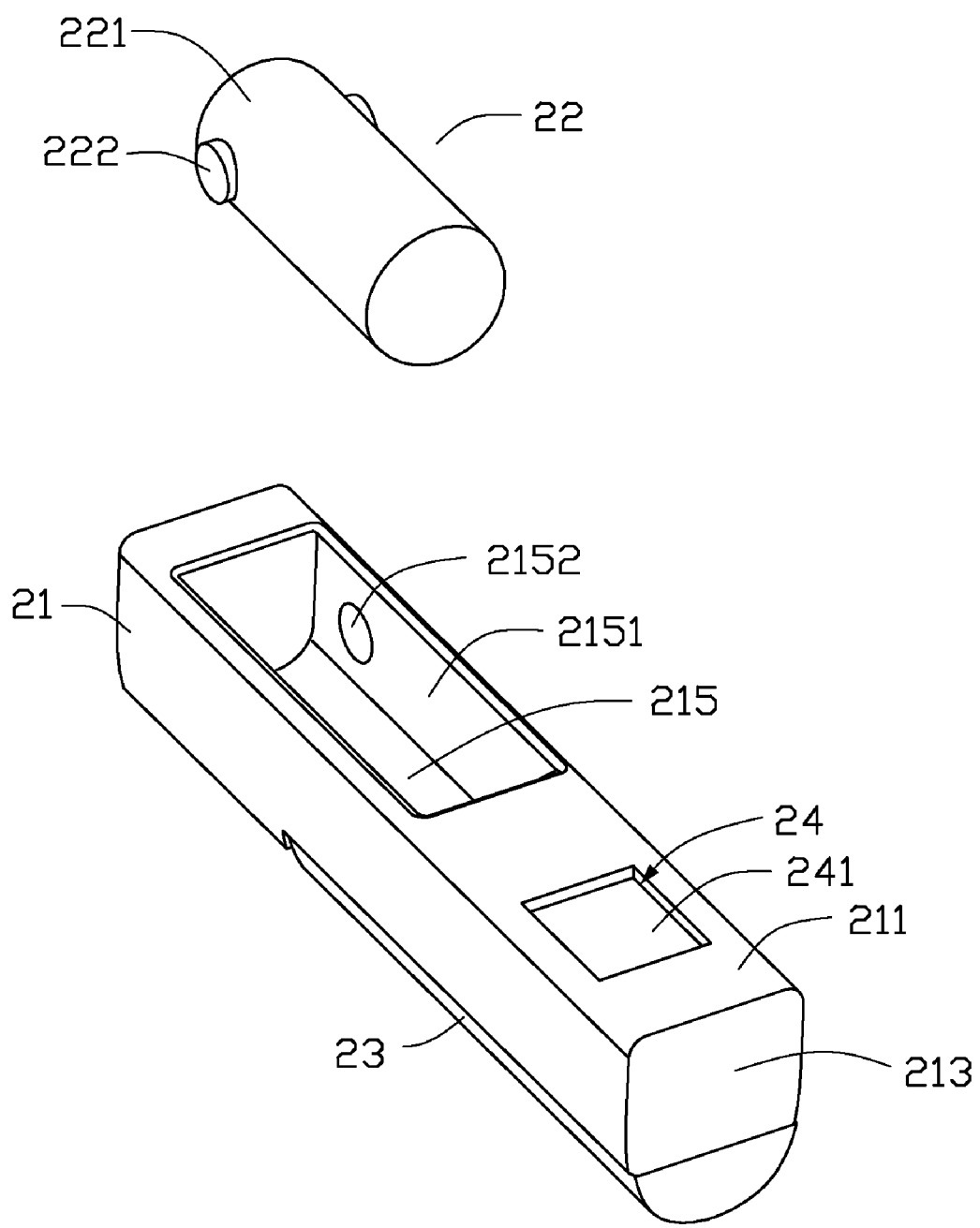
FIG. 3 is an exploded view of the Bluetooth peripheral.
Figure 4:
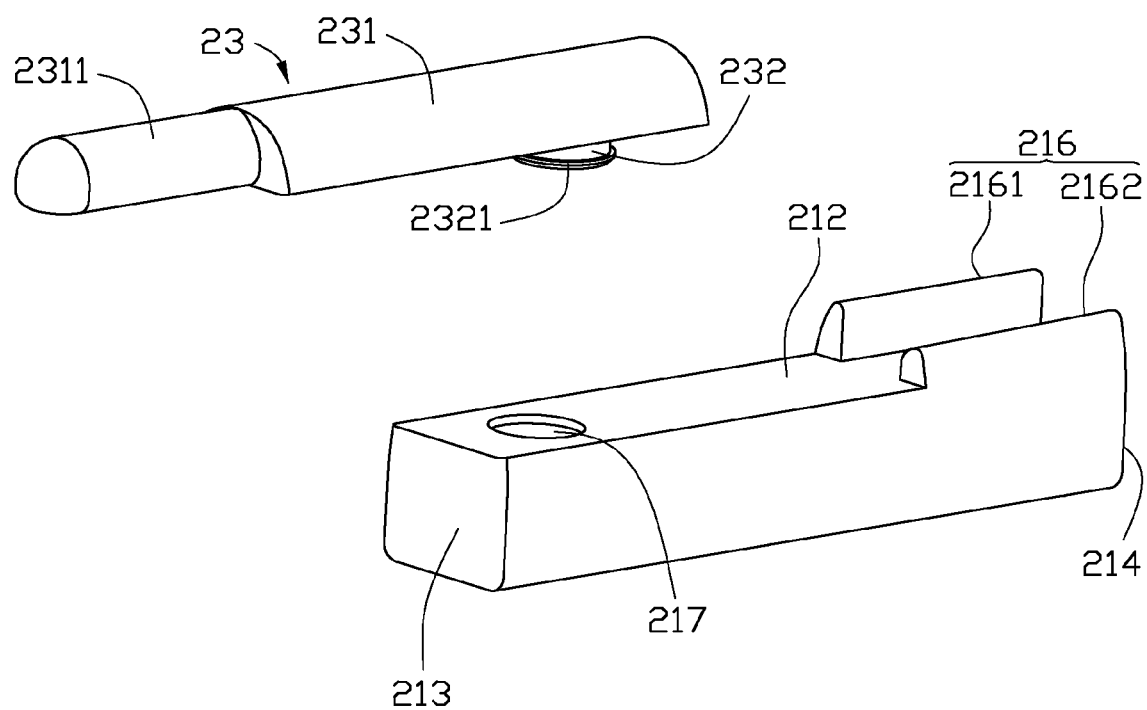
FIG. 4 is similar to FIG. 3, but viewed from another angle.
Figure 5:
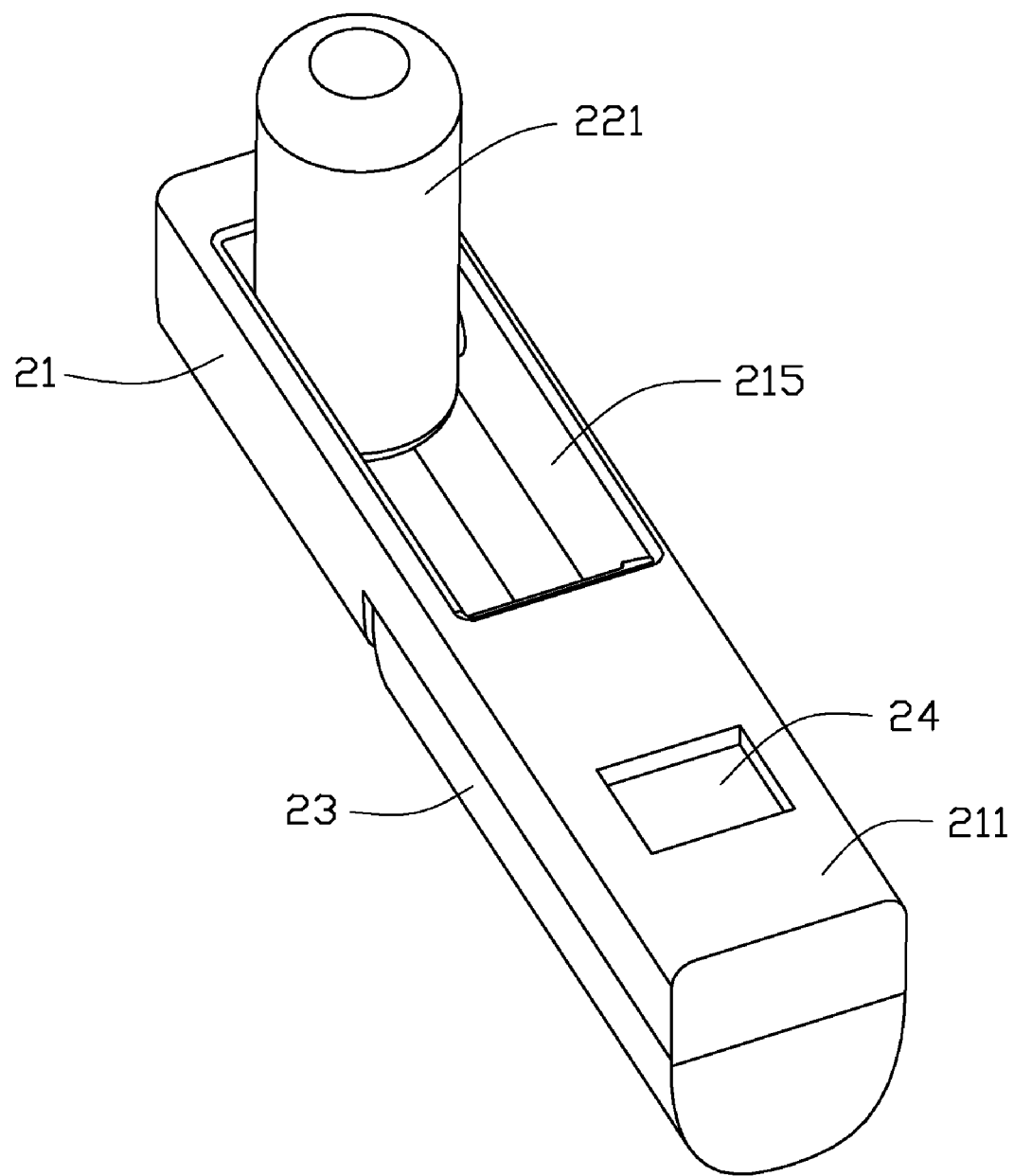
FIG. 5 is an isometric view of the Bluetooth peripheral used as a Bluetooth earphone.
Figure 6:
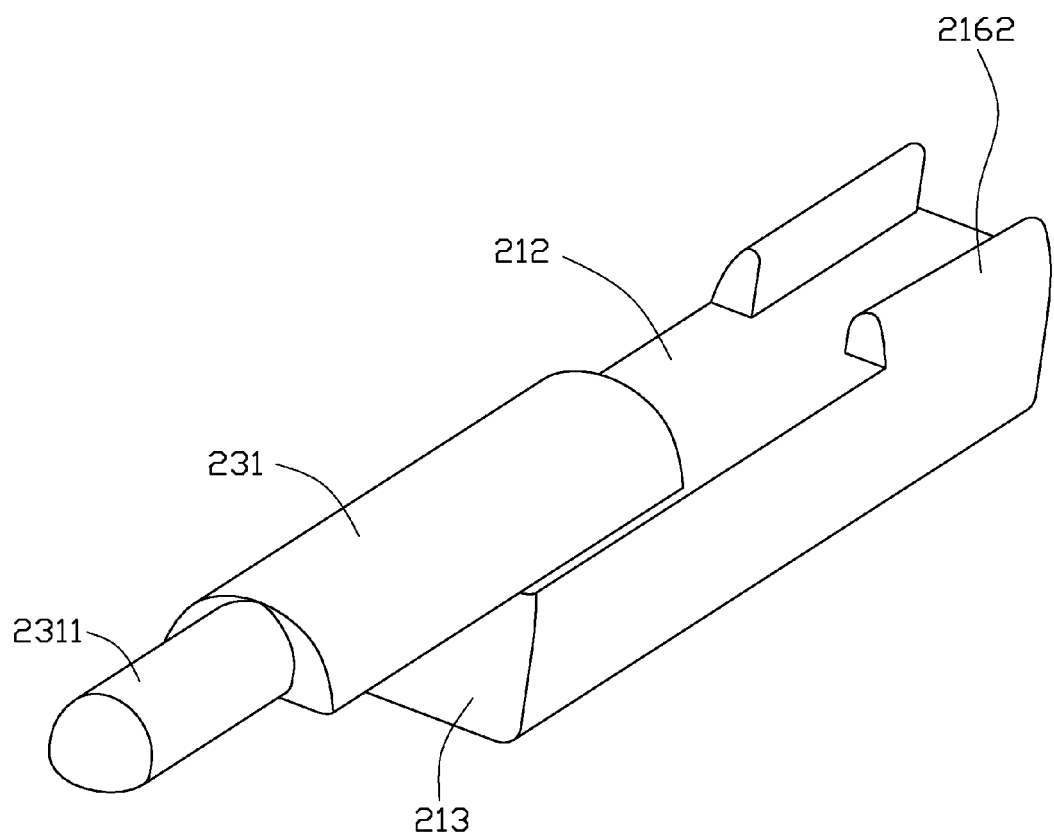
FIG. 6 is an isometric view of the Bluetooth peripheral used as a stylus.

FIG. 2 through FIG. 4 show a peripheral, such as the Bluetooth peripheral 20 for detachable assembly in the receiving chamber 13. The Bluetooth peripheral 20 includes a sleeve 21, a Bluetooth earphone 22, a stylus 23, and a fixing hole 24. The sleeve 21 includes a first portion 211, a second portion 212, and two end portions 213, 214. The end portions 213, 214 connect the first portion 211 to the second portion 212.

The first portion 211 defines an assembly chamber 215 including two inner sidewalls 2151. The inner sidewalls 2151 define two coaxial holes 2152, such as blind holes, adjacent to the end portion 214. A first rib 2161 and a second rib 2162 protrude from the second portion 212. The first rib 2161 has a higher height than the second rib 2162 relative the second portion 212. The second portion 212 defines a through hole 217 spaced from the first rib 2161 and the second rib 2162.

The Bluetooth earphone 22 includes a Bluetooth earphone section 221 and two shafts 222 protruding from opposite peripheral walls or sides of the Bluetooth earphone section 221. The Bluetooth earphone section 221 can be received in the assembly chamber 215. The two shafts 222 can be rotatably received in corresponding blind holes 2152.

The stylus 23 includes a pointing portion 231 and a protrusion 232. The pointing portion 231 includes a contact tip 2311. The protrusion 232 can be made of rubber and positioned on the pointing portion 231 distal to the contact tip 2311. The protrusion 232 includes a latching portion 2321. The protrusion 232 can be rotatably assembled in the through hole 217. The latching portion 2321 passes through the through hole 217 and latches to the second portion 212. The contact tip 2311 latches between the first rib 2161 and the second rib 2162. Accordingly, the pointing portion 231 can be assembled to the second portion 212.

The fixing hole 24 is defined in the first portion 211. A second magnet 241 is inserted into the fixing hole 24. When the Bluetooth peripheral 20 is received in the receiving chamber 13, the first magnet 131 will attract the second magnet 241. Thus, the Bluetooth peripheral 20 can be firmly secured in the receiving chamber 13 by the magnetic attracting force between the first magnet 131 and the second magnet 241.

In use, the sleeve 21 can be removed from the receiving chamber 13. The Bluetooth earphone section 221 can be rotated out of the assembly chamber 215 for use. The pointing portion 231 can be released from between the first rib 2161 and the second rib 2162 by rotating the pointing portion 231 about the protrusion 232.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A Bluetooth peripheral, comprising:
    a sleeve comprising a first surface and a second surface opposite to the first surface;
    a Bluetooth earphone received in the first surface of the sleeve; and
    a stylus latched to the second surface of the sleeve; wherein the sleeve comprises an assembly chamber defined in the first surface, the Bluetooth earphone is rotatably assembled in the assembly chamber; the Bluetooth earphone comprises two shafts symmetric positioned thereon, the assembly chamber defines two blind holes corresponding to the shafts, the shafts are received in the blind holes; the sleeve further comprises a first rib and a second rib extending from the sleeve, a second portion of the assembly chamber defines a through hole, the stylus comprises a protrusion rotatable in the through hole and a contact tip latching to the first rib and the second rib.

2. The Bluetooth peripheral as claimed in claim 1, wherein the first rib is higher than the second rib.

3. The Bluetooth peripheral as claimed in claim 2, wherein the sleeve further comprises a first portion defining the assembly chamber, an opposite second portion, two opposite end portion connecting the first portion to the second portion, and a second magnet inserted into the first portion; the first rib and the second rib extend from second portion; the through hole is defined in the second portion.

4. A portable electronic device, comprising:
a main body defining a receiving chamber; and
a Bluetooth peripheral detachably assembled in the receiving chamber, comprising:
a sleeve comprising a first surface and a second surface opposite to the first surface;
a Bluetooth earphone received in the first surface of the sleeve; and
a stylus latched to the second surface of the sleeve; wherein the sleeve comprises an assembly chamber defined in the first surface, the Bluetooth earphone is rotatably assembled in the assembly chamber; the Bluetooth earphone comprises two shafts symmetric positioned thereon, the assembly chamber defines two blind holes corresponding to the shafts, the shafts are received in the blind holes; the sleeve further comprises a first rib and a second rib extending from the sleeve, a second portion of the assembly chamber defines a through hole, the stylus comprises a protrusion rotatable in the through hole and a contact tip latching to the first rib and the second rib.

5. The portable electronic device as claimed in claim 4, wherein the first rib is higher than the second rib.

6. The portable electronic device as claimed in claim 5, wherein the sleeve further comprises a first portion defining the assembly chamber, an opposite second portion, two opposite end portion connecting the first portion to the second portion, and a second magnet inserted into the first portion; the first rib and the second rib extend from second portion; the through hole is defined in the second portion.

* * * * *